United States Patent
Romero

(10) Patent No.: US 7,904,910 B2
(45) Date of Patent: Mar. 8, 2011

(54) CLUSTER SYSTEM AND METHOD FOR OPERATING CLUSTER NODES

(75) Inventor: Francisco Romero, Plano, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1826 days.

(21) Appl. No.: 10/893,825

(22) Filed: Jul. 19, 2004

(65) Prior Publication Data

US 2006/0031843 A1 Feb. 9, 2006

(51) Int. Cl.
G06F 3/00 (2006.01)
G06F 9/46 (2006.01)
G06F 15/173 (2006.01)

(52) U.S. Cl. .......................... 719/310; 718/105; 709/224

(58) Field of Classification Search .......... 709/223–116; 719/310; 718/100, 105
See application file for complete search history.

(56) References Cited

U.S. PATENT DOCUMENTS

| | | | |
|---|---|---|---|
| 5,991,793 A * | 11/1999 | Mukaida et al. | 718/104 |
| 6,195,680 B1 * | 2/2001 | Goldszmidt et al. | 709/203 |
| 7,089,293 B2 * | 8/2006 | Grosner et al. | 709/217 |
| 7,124,188 B2 * | 10/2006 | Mangipudi et al. | 709/226 |
| 7,328,259 B2 * | 2/2008 | Srinivasan et al. | 709/223 |
| 7,478,149 B2 * | 1/2009 | Joshi et al. | 709/223 |
| 2004/0015581 A1 * | 1/2004 | Forbes | 709/224 |
| 2004/0162901 A1 * | 8/2004 | Mangipudi et al. | 709/225 |

FOREIGN PATENT DOCUMENTS

| | | |
|---|---|---|
| JP | 08083257 | 3/1996 |
| JP | 2001-195268 | 7/2001 |
| JP | 2003256310 | 9/2003 |
| JP | 2004-021982 | 1/2004 |

OTHER PUBLICATIONS

Valeria Cardellini, Dynamic Load Balancing on Web-servicer systems, 1999.*
U.S. Appl. No. 09/493,753, filed Jan. 28, 2000, McCarthy.

* cited by examiner

Primary Examiner — Lechi Truong

(57) ABSTRACT

In one embodiment, a cluster system comprises a plurality of cluster nodes for executing a plurality of applications, and a management process for controlling the plurality of cluster nodes, wherein the management process is operable to identify a first application that is not meeting a service level objective (SLO), to select a cluster node that is not currently executing the first application, to progressively decrease routing of transactions to the selected cluster node for a second application, and to progressively increase routing of transactions to the selected cluster node for the first application.

23 Claims, 3 Drawing Sheets

CLUSTER SYSTEM AND METHOD FOR OPERATING CLUSTER NODES

DESCRIPTION OF THE RELATED ART

Recent application architectures frequently support clustered execution of applications. Clustered execution refers to the execution of an application as a collection of instances (identical instances in most cases) on a set of systems such that the workload is distributed and, in some cases, balanced across those systems. If any particular system fails, the workload continues on the remaining systems as usual or with some degradation in performance.

There are a number of advantages to clustered execution. For example, clustered execution provides higher availability, because the failure of a cluster node does not cause a complete application failure. Additionally, clustered execution typically results in lower costs, because expansion may occur on an incremental basis using smaller servers, instead of replacing a monolithic server with a larger one. For the same reason, faster scaling of the distributed application may occur. Also, load balancing and disaster tolerance may be employed using geographical distribution of the servers.

SUMMARY

In one embodiment, a cluster system comprises a plurality of cluster nodes for executing a plurality of applications, and a management process for controlling the plurality of cluster nodes, wherein the management process is operable to identify a first application that is not meeting a service level objective (SLO), to select a cluster node that is not currently executing the first application, to progressively decrease routing of transactions to the selected cluster node for a second application, and to progressively increase routing of transactions to the selected cluster node for the first application.

In another embodiment, a method of operating a plurality of cluster nodes comprises detecting that a first application is not meeting a service level objective, selecting a node executing a second application for reallocation, progressively decreasing routing of transactions associated with the second application to the selected node, and progressively increasing routing of transactions associated with the first application to the selected node.

In another embodiment, a system comprises a plurality of means for executing a plurality of computer applications in a clustered architecture, means for detecting that a first computer application is not meeting a service level objective, means for selecting one of the plurality of means for executing that is executing a second computer application, means for progressively decreasing routing of transactions of the second computer application to the selected means for executing, and means for progressively increasing routing of transactions of the first computer application to the selected means for executing, wherein the means for progressively increasing and the means for progressively decreasing operate concurrently.

DETAILED DESCRIPTION

Typical distributed applications are implemented using a respective dedicated cluster for each application. However, dedicated clusters are problematic when responding to sudden spikes in demand. All systems of a cluster could become saturated thereby leading to resource exhaustion. The potential of resource exhaustion is increased by the open connectedness of intranets and extranets supported by many organizations. Specifically, a sudden surge in connections could render a cluster inoperative because of resource exhaustion. While management tools exist to detect this condition, recovery is normally a manual process.

Figure 1:
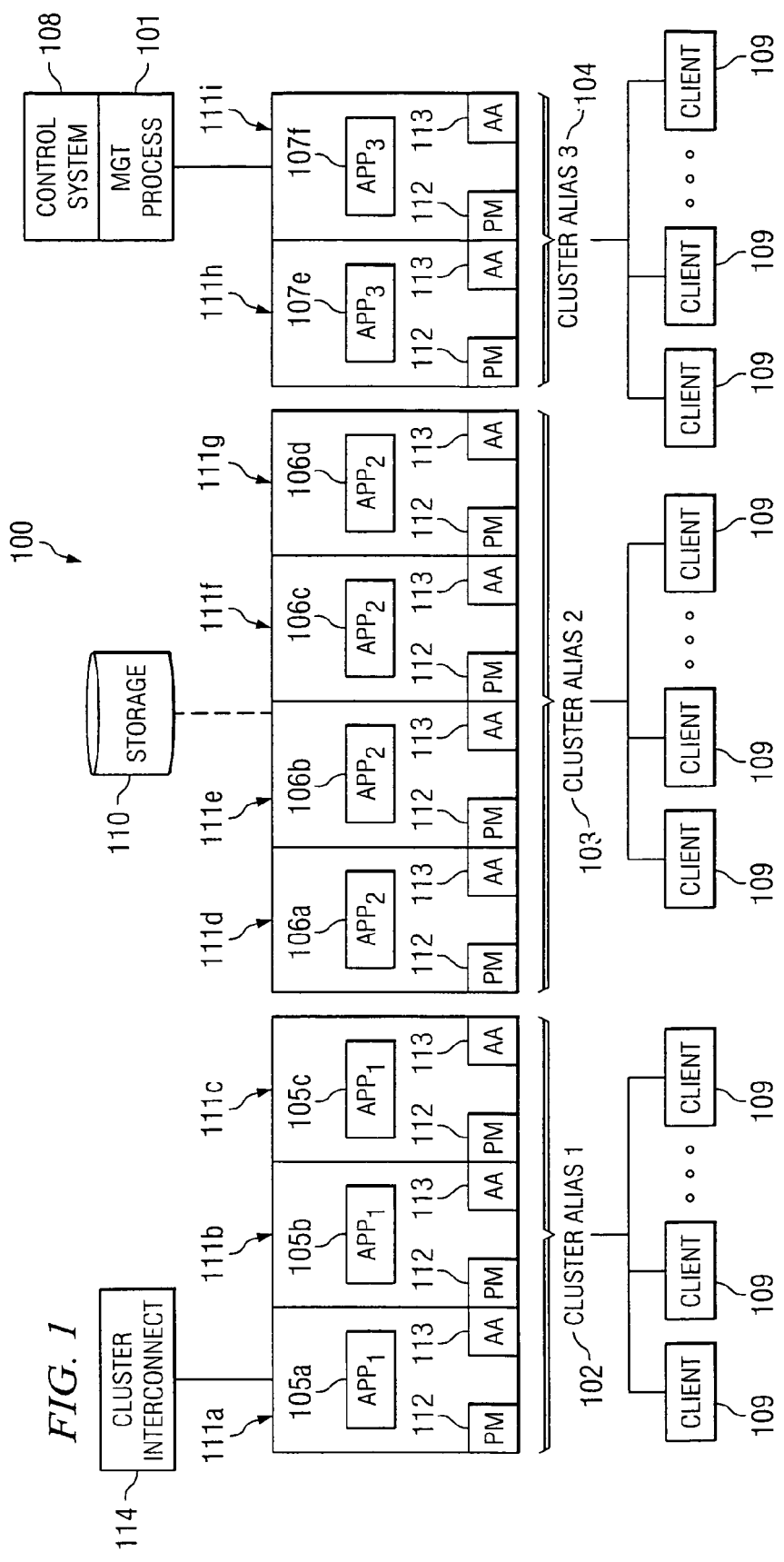
FIG. 1 depicts a cluster system according to one representative embodiment.

Referring now to the drawings, FIG. 1 depicts system 100 that dynamically allocates server resources according to one representative embodiment. System 100 could be implemented using a Single System Imaging (SSI) cluster (such as a TruCluster from Hewlett-Packard Company). An SSI cluster refers to a collection of systems with hardware and software connectivity that present an "image" of a single node to system administrators and applications. Specifically, a plurality of nodes can be administered as a single platform. Furthermore, a given application may be executed on multiple nodes of the cluster while clients of the application view the application as executed on a single system using Internet Protocol (IP) address aliasing. An SSI cluster typically includes file system 110 for coherent access to all file systems including a root-single copy of configuration files (not shown). Transparent, highly availability to file system 110 and clusterized volume management are typically provided. Additional details regarding SSI clusters are available from the publication "Cluster Hardware Configuration: TruCluster Server Version 5.1B," published by Hewlett-Packard Company, September 2002, which is incorporated herein by reference.

As shown in FIG. 1, the cluster is managed by management process 101 executed on control system 108. Alternatively, management process 101 may be executed on one of nodes 111a-i of the cluster. Cluster interconnect 114 may be used for dedicated, high performance, internode communication. Cluster interconnect 114 may be implemented by mapping transfers directly into the memory of nodes 111. Applications (APP$_1$, APP$_2$, and APP$_3$) may provide services to respective clients 109. The applications are implemented by providing an instance of the respective software code on each node 111. For example, software instances 105a-105c are provided for APP$_1$, software instances 106a-106d are provided for APP$_2$, and software instances 107a and 107b are provided for APP$_3$. It shall be appreciated that FIG. 1 is given by way of example. Any suitable cluster architecture and applications may be employed by representative embodiments.

Each node 111 may be implemented using a suitable computer platform and associated server software. Upon deployment of nodes 111, the executable software for the applications may be stored on nodes 111. Management process 101 may control which particular software processes are executed on a respective node by communication with application administration (AA) modules 113. For example, in one embodiment, "Application Definition Files" (ADF) are used to identify the applications that can be executed on a node 111, scripts identifying how to start each application on the node 111, information related to how to stop execution of each application on the node 111, and/or the like. When management process 101 determines that a node 111 should execute a particular application, management process 101 sends a suitable signal or message to the respective AA module 113. The ADF is used to create an instance of the application for execution. Management process 101 may cause the execution of application instance on a particular node 111 to cease in a similar manner.

As shown in FIG. 1, the cluster is divided into subclusters using cluster aliases 102, 103, and 104. Each cluster alias is associated with an IP address that enables clients 109 to access the respective subcluster. Cluster alias 102 is associated with three nodes (111a-111c) executing application instances 105a-105c, cluster alias 103 is associated with four nodes (111d-111g) executing application instances 106a-106d, and cluster alias 104 is associated with two nodes (111h-111i) executing application instances 107a and 107b.

Each application may be assigned a relative priority. The relative priority defines the relative importance of the applications executed on the subclusters. In this example, applications $APP_1$ and $APP_2$ may perform online database transaction processing and $APP_3$ may perform batch services. Accordingly, applications $APP_1$ and $APP_2$ are assigned a higher relative priority than the priority of cluster alias $APP_3$.

Each subcluster, application, or node may be assigned service level objectives (SLOs). An SLO is a defined resource utilization metric or performance objective metric. For example, an SLO for cluster alias 103 could be that application $APP_2$ provides an average response time of ten milliseconds to defined query types. Alternatively, utilization of CPU/memory/IO resources for a particular node 111 should remain below 80 percent or any other suitable level. Each performance monitor 112 examines the operations associated with a respective node 111 and communicate suitable metrics to management process 101. Management process 101 uses the metrics to perform the SLO analysis and reallocate nodes 111 as appropriate.

Furthermore, each cluster alias may be configured such that nodes 111 have a default "weight" using the cluster infrastructure. The weight indicates the relative amount of subcluster transactions routed to a particular node 111. Each subcluster may have a predetermined weight for all nodes 111 (a subcluster default weight (SDW)) in a respective subcluster. Alternatively, upon instantiation of a subcluster, the various nodes 111 of a respective subcluster may be assigned non-uniform weights.

Figure 2:
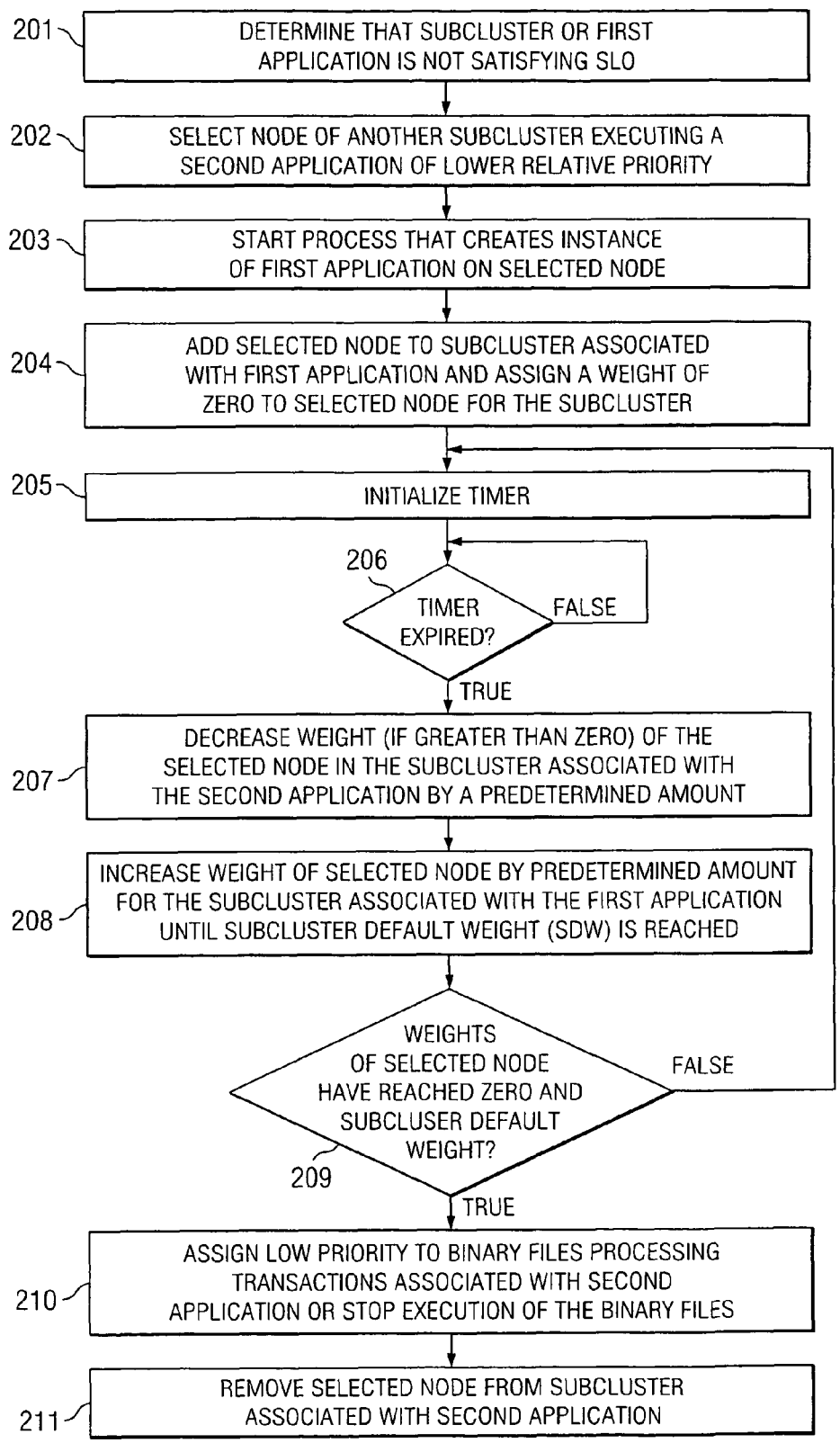
FIG. 2 depicts a flowchart for allocating a cluster node according to one representative embodiment.

FIG. 2 depicts a flowchart for allocating server resources in a cluster architecture. The flowchart of FIG. 2 could be implemented as executable code or software instructions within management process 101 as an example.

For the purpose of the present example, assume that $APP_2$ associated with cluster alias 103 is not achieving its SLO. Accordingly, $APP_2$ would benefit from more resources than currently allocated. Also, assume that $APP_3$ associated with cluster alias 104 is consistently achieving its SLO. $APP_1$ associated with cluster 102 is assumed to be achieving its SLO for the majority of the time.

In step 201, a determination is made that a first subcluster (the subcluster associated with cluster alias 103) or, equivalently, a first application ($APP_2$) is not satisfying its SLO. For example, the response time of the first application to defined transactions may fall below a predetermined threshold. Alternatively, the memory usage, processor usage, or I/O resource usage may exceed a predetermined threshold thereby indicating deteriorated performance of the application.

In step 202, a respective node 111 (e.g., node 111h) of another subcluster (associated with subcluster 104) is selected that is executing a second application ($APP_3$). For example, the selection of node 111h may occur using the relative priorities of the subclusters or applications. In step 203, a process is started on the selected node 111h that creates an instance of the first application ($APP_2$) on the selected node 111h. The process may be initialized by communication of a suitable message from management process 101 to the respective AA module 113.

In step 204, the selected node 111h is added to the subcluster (associated with cluster alias 103) of the first application ($APP_2$) and assigned a weight of zero for the subcluster. The weight of zero causes no traffic associated with the first application to be initially sent to the selected node 111h.

In step 205, a timer is initialized. For example, a specific time period may be set for the timer. The time period may be selected by considering the protocols used for the respective applications and the average transaction times. For example, if transmission control protocol/Internet Protocol (TCP/IP) persistent connections are used to support relatively long application sessions, the time period may be relatively high (e.g., seconds) to prevent an inordinate number of TCP/IP connections with clients 109 from being broken. Alternatively, if the transactions are relatively short (e.g., for low complexity database look-ups), the time period may be a relatively low amount. Also, the time period may be implemented as a tunable parameter.

In step 206, a logical comparison is made to determine whether the time has expired. If not, the process flow iterates until the timer has expired. When the time expires, the process flow proceeds to step 207.

In step 207, the weight of the selected node 111h in the subcluster associated with the second application ($APP_3$) is decreased by a predetermined amount as long as the weight is greater than zero.

In step 208, the weight of the selected node 111h for the subcluster associated with the first application ($APP_2$) is increased by a predetermined amount until the subcluster default weight (SDW) or other suitable weight is reached.

In step 209, a logical comparison is made to determine whether the weights of the selected node 111h for these subclusters have reached zero and the SDW. If not, the process flow returns to step 205. If the weights have reached the desired weights, the process flow proceeds to step 210.

By managing the weights of the selected node 111h in association with reallocation of node 111h, the operations of the applications may occur in an advantageous manner. Specifically, the reallocation of node 111h may occur over a sufficient amount of time that clients 109 associated with the second application will not typically observe appreciably degraded performance. For example, an inordinate amount of persistent TCP/IP sessions will not be broken. Moreover, as transactions associated with the second application complete, the weight associated with the first application is being incrementally increased. Accordingly, the resources are transitioned to the first application efficiently without undue latency.

In step 210, a low priority may be assigned to binary files processing transactions associated with the second application or, alternatively, the execution of the binary files could be stopped.

In step 211, the selected node 111h is removed from the subcluster associated with the second application (application 107).

Although one embodiment has been described as reallocating resources from an application having lower priority, the present invention is not so limited. For example, multiple higher priority applications may attempt to simultaneously acquire the same node from a single lower priority application. An arbitration algorithm may be employed to allocate the node between the two higher priority applications such as the algorithms disclosed in U.S. Pat. No. 7,228,546, issued Jun. 5, 2007, entitled "DYNAMIC MANAGEMENT OF COMPUTER WORKLOADS THROUGH SERVICE LEVEL OPTIMIZATION," which is incorporated herein by reference. Furthermore, additional criteria may be used to select a node for reallocation. For example, it may be advantageous to reallocate a node from an application having equal or greater priority that is well within its SLO, rather than reallocating a node from an application of lower priority that is not meeting its SLO.

Figure 3:
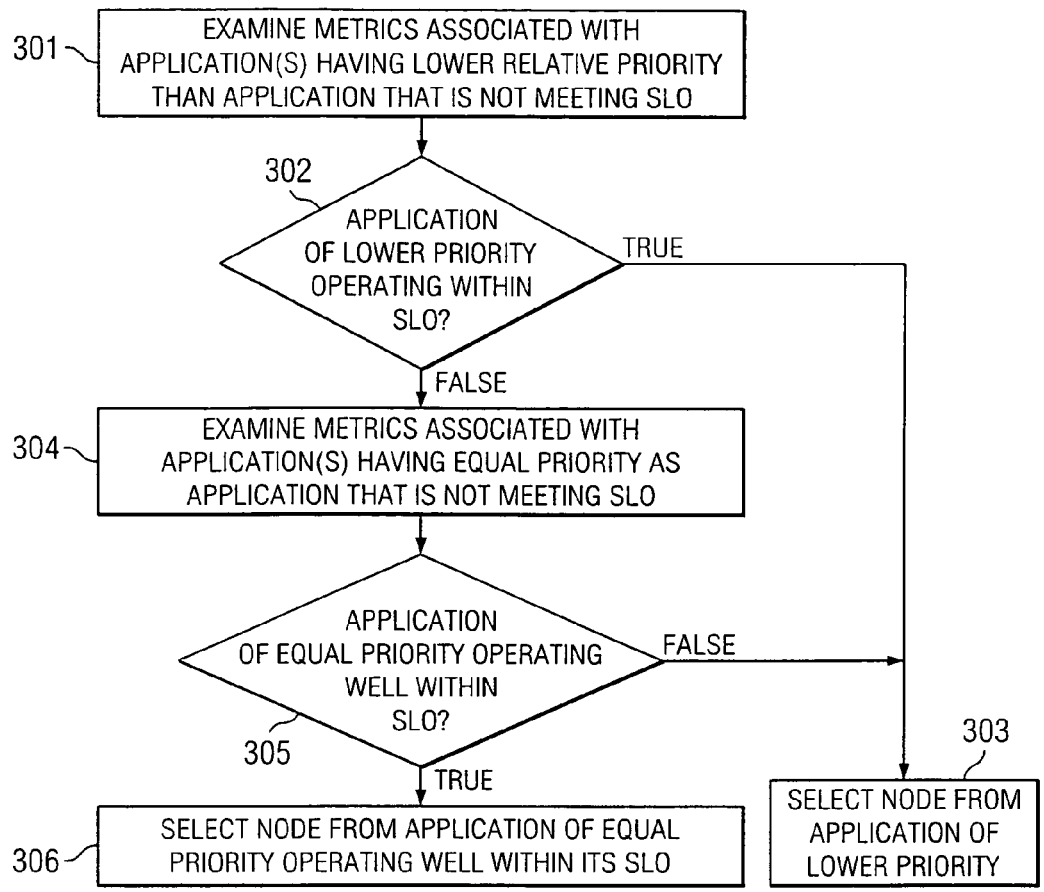
FIG. 3 depicts a flowchart for selecting a node for reallocation according to one representative embodiment.

FIG. 3 depicts a flowchart for selecting a node for reallocation according to one representative embodiment. The flowchart of FIG. 3 could be implemented as executable code or software instructions within management process 101 as an example. In step 301, the metrics associated with an application or applications having lower relative priority than an application that is currently not meeting its SLO are examined. In step 302, a logical comparison is made to determine whether an application of lower priority is operating within its SLO. If true, the process flow proceeds to step 303 where a node 111 executing the application of lower relative priority is selected for reallocation. If the logical determination of step 302 is false, the process flow proceeds to step 304.

In step 304, metrics associated with an application or applications having equal priority are examined. In step 305, a logical comparison is made to determine whether an application of equal priority is operating well within its SLO. For example, if an application of equal priority is being executed on three nodes 111, the application has an SLO of 80% resource utilization, and the utilization metrics indicate that 20% utilization exists, the reallocation of one node 111 from the respective subcluster will most likely not cause degraded performance.

If the logical comparison of step 305 is true, the process flow proceeds to step 306. In step 306, a node 111 associated with the application having equal priority is selected for reallocation. If the logical comparison of step 305 is false, the process flow proceeds to step 303. In step 303, a node 111 executing an application of lower priority is selected for reallocation.

By selecting nodes 111 for reallocation in this manner, the effects on application performance may be minimized. Specifically, if possible, a node is selected that will cause little effect on the performance of the application previously executed on the selected node. If it is not possible to do so, the effect of the reallocation is observed in the performance of an application of lower priority. The process flow of FIG. 3 is by way of example. Other suitable criteria for reallocation may be analyzed. Furthermore, applications of higher priority could be likewise examined to determine if reallocation of a node would have de minimis effect on an application of higher priority.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a computer readable storage medium such as a ROM, a flash memory, an erasable ROM (EROM), a floppy diskette, a compact disk CD-ROM, an optical disk, a hard disk, and a fiber optic medium, a radio frequency (RF) link, etc. The code segments may be downloaded via computer networks such as the Internet, intranet, etc.

Figure 4:
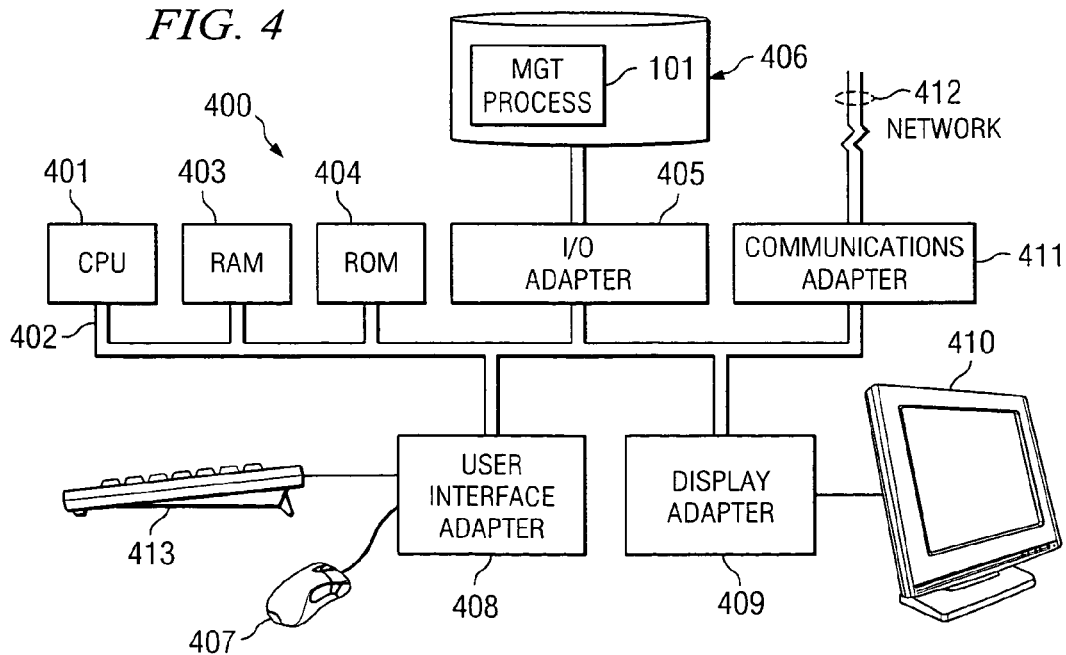
FIG. 4 depicts a computer system adapted according to one representative embodiment.

FIG. 4 illustrates computer system 400 adapted according to one representative embodiment. Central processing unit (CPU) 401 is coupled to system bus 402. The CPU 401 may be any general purpose CPU. However, the present invention is not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

Bus 402 is also coupled to input/output (I/O) controller card 405, communications adapter card 411, user interface card 408, and display card 409. I/O card 405 connects to storage devices 406, such as one or more of hard drive, CD drive, floppy disk drive, tape drive, to the computer system. Storage devices 406 may store the software or executable code for controlling the routing of transaction to nodes of a clustered architecture and for controlling which applications are executed on the nodes. For example, storage devices 406 may store executable code implementing management process 101 according to one representative embodiment.

Communications card 411 is adapted to couple the computer system 400 to a network 412, which may be one or more of local (LAN), wide-area (WAN), ethernet or Internet network. User interface card 408 couples user input devices, such as keyboard 413 and pointing device 407, to the computer system 400. Display card 409 is driven by CPU 401 to control the display on display device 410.

Some representative embodiments enable efficient operation of cluster applications. Nodes of a cluster are dynamically allocated for particular applications in response to observed demand. A smaller number of nodes can be used to support applications without risking resource exhaustion. Accordingly, over-provisioning of resources can be avoided. Moreover, by examining application performance during the selection of nodes for reallocation, the reallocation of nodes may occur in a manner that is largely transparent to clients. Also, the use of relative priorities enables "critical" or important applications to maintain appropriate performance criteria when the reallocation may cause observed changes in application performance.

What is claimed is:

1. A cluster system comprising:
a plurality of cluster nodes coupled with a computer for executing a plurality of applications; and
a management processor coupled with said computer for controlling said plurality of cluster nodes on said computer, wherein said management processor is operable to identify a first application that is not meeting a service level objective (SLO), to select a cluster node that is not currently executing said first application based on a relative importance of said plurality of applications executed on said plurality of cluster nodes, to create an instance of said first application on selected cluster node, to add said selected cluster node to a subcluster of said first application and assign a weight of zero for said subcluster, wherein said weight of zero causes no traffic associated with said first application to be initially sent to said selected cluster node, to initialize a timer in which a time period is selected based on at least one of protocols used for said first application and a second application and an average transaction time, to determine if said time period is expired, and if said time period is expired, to progressively decrease routing of transactions to said selected cluster node for said second application, and to progressively increase routing of transactions to said selected cluster node for said first application, said progressively decrease routing of transactions such that an observed appreciably degraded performance of said second application is reduced,
wherein said management processor is operable to select said cluster node by examining cluster nodes associated with an application of lower priority.

2. The cluster system of claim 1 wherein said management processor is operable to select said cluster node by examining cluster nodes associated with an application of equal or higher priority.

3. The cluster system of claim 1 wherein said management processor is operable to determine whether reallocation of said cluster node will cause said second application to cease meeting a service level objective of said second application.

4. The cluster system of claim 1 wherein respective performance monitoring processes on said plurality of cluster nodes communicate performance metric information to said management process.

5. The cluster system of claim 1 wherein said management processor communicates a signal to an application administration module of said selected cluster node to begin execution of said first application on said selected cluster node.

6. The cluster system of claim 1 wherein files of said first application are identified by an application definition file.

7. A method of operating a plurality of cluster nodes, comprising:
detecting by a computer that a first application is not meeting a service level objective;
selecting by said computer a cluster node executing a second application for reallocation based on a relative importance of a plurality of applications comprising said second application and executed on said plurality of cluster nodes;
creating an instance of said first application on selected cluster node; adding said selected cluster node to a subcluster of said first application; assigning a weight of zero for said subcluster, wherein said weight of zero causes no traffic associated with said first application to be initially sent to said selected cluster node; initializing a timer in which a time period is selected based on at least one of protocols used for said first application and a second application and an average transaction time; determining if said time period is expired; if said time period is expired, progressively decreasing routing by said computer of transactions associated with said second application to said selected node; and
progressively increasing routing by said computer of transactions associated with said first application to said selected node, said progressively decreasing routing of transactions such that an observed appreciably degraded performance of said second application is reduced, wherein said progressively decreasing and increasing occur concurrently.

8. The method of claim 7 wherein said service level objective defines an expected response time of a predetermined transaction type.

9. The method of claim 7 wherein said service level objective defines a limit for resource utilization.

10. The method of claim 7 further comprising:
operating performance monitoring processes by said computer on said plurality of cluster nodes to facilitate said detecting.

11. The method of claim 7 further comprising:
determining by said computer whether reallocation of said selected node will cause another application to cease meeting a service level objective.

12. The method of claim 11 wherein said selecting selects between a cluster node associated with an application of lower priority and a cluster node associated with an application of at least equal priority in response to said determining.

13. The method of claim 7 wherein said progressively decreasing and increasing comprise:
increasing by said computer a subcluster weight of said selected cluster node for said first application; and
decreasing by said computer a subcluster weight of said selected cluster node for said second application.

14. A system comprising:
a plurality of means for executing by a computer a plurality of computer applications in a clustered architecture;
means for detecting by said computer that a first computer application is not meeting a service level objective;
means for selecting by said computer one of said plurality of means for executing that is executing a second computer application, said selecting based on a relative importance of said plurality of computer applications executed on a plurality of cluster nodes;
means for creating by said computer an instance of said first application on selected one of said plurality of means for executing;
means for adding by said computer said selected one of said plurality of means for executing to a subcluster of said first application;
means for assigning by said computer a weight of zero for said subcluster, wherein said weight of zero causes no traffic associated with said first application to be initially sent to said selected one of said plurality of means for executing;
means for initializing by said computer a timer in which a time period is selected based on at least one of protocols used for said first application and a second application and an average transaction time;
means for determining by said computer if said time period is expired; means for progressively decreasing by said computer routing of transactions of said second computer application to said selected means for executing, if said time period is expired; and
means for progressively increasing by said computer routing of transactions of said first computer application to said selected means for executing, wherein said means for progressively increasing and said means for progressively decreasing operate concurrently, said progressively decreasing by said computer routing of transactions such that an observed appreciably degraded performance of said second application is reduced,
wherein said means for selecting is operable to determine whether reallocation of said one of said plurality of means for executing will degrade performance of said second computer application.

15. The system of claim 14 wherein said means for selecting examines means for executing associated with computer applications of lower relative priority than said first computer application before examining means for executing associated with computer applications of equal priority.

16. The system of claim 14 wherein each of said plurality of means for executing further executes a respective means for generating performance metric information for communication to said means for detecting.

17. The system of claim 14 wherein said service level objective is related to a resource utilization rate of one of said means for executing.

18. A computer readable storage medium including executable instructions for operating a plurality of cluster nodes and excluding signals and carrier waves, said computer readable medium comprising:

code for detecting that a first application is not meeting a service level objective;

code for selecting a cluster node executing a second application for reallocation, said selecting based on a relative importance of a plurality of applications comprising said second application and executed on said plurality of cluster nodes;

code for creating an instance of said first application on selected cluster node:

code for adding said selected cluster node to a subcluster of said first application;

code for assigning a weight of zero for said subcluster, wherein said weight of zero causes no traffic associated with said first application to be initially sent to said selected cluster node;

code for initializing a timer in which a time period is selected based on at least one of protocols used for said first application and a second application and an average transaction time;

code for determining if said time period is expired;

code for progressively decreasing routing of transactions associated with said second application to said selected node if said time period is expired; and code for progressively increasing routing of transactions associated with said first application to said selected node, said progressively routing of transactions such that an observed appreciably degraded performance of said second application is reduced, wherein said code for progressively decreasing and code for progressively increasing operate concurrently.

19. The computer readable storage medium of claim 18 wherein said service level objective defines an expected response time of a predetermined transaction type.

20. The computer readable storage medium of claim 18 wherein said service level objective defines a limit for resource utilization.

21. The computer readable storage medium of claim 18 further comprising:

code for monitoring processes on each of said plurality of cluster nodes to facilitate said detecting.

22. The computer readable storage medium of claim 18 further comprising:

code for determining whether reallocation of said selected node will cause another application to cease meeting a service level objective.

23. The computer readable storage medium of claim 22 wherein said code for selecting selects between a cluster node associated with an application of lower priority and a cluster node associated with an application of at least equal priority in response to said determining.

* * * * *